US011912013B2

(12) United States Patent
Murphy et al.

(10) Patent No.: US 11,912,013 B2
(45) Date of Patent: Feb. 27, 2024

(54) CHARGED PARTICLE GENERATION, FILTRATION, AND DELIVERY FOR DIGITAL OFFSET PRINTING APPLICATIONS

(71) Applicants: Xerox Corporation, Norwalk, CT (US); Palo Alto Research Center Incorporated, Palo Alto, CA (US)

(72) Inventors: Kathryn F. Murphy, Redwood City, CA (US); Thomas Wunderer, Santa Cruz, CA (US); Anne Plochowietz, Mountain View, CA (US); David K. Biegelsen, Portola Valley, CA (US); Joerg Martini, San Francisco, CA (US); David Mathew Johnson, San Francisco, CA (US); Palghat S. Ramesh, Pittsford, NY (US)

(73) Assignee: Xerox Corporation, Norwalk, CT (US)

( * ) Notice: Subject to any disclaimer, the term of this patent is extended or adjusted under 35 U.S.C. 154(b) by 647 days.

(21) Appl. No.: 17/152,597

(22) Filed: Jan. 19, 2021

(65) Prior Publication Data

US 2022/0227122 A1 Jul. 21, 2022

(51) Int. Cl.
*B41F 31/02* (2006.01)
*B41M 1/06* (2006.01)
(Continued)

(52) U.S. Cl.
CPC ................ *B41F 31/02* (2013.01); *B41F 3/34* (2013.01); *B41F 7/02* (2013.01); *B41F 7/30* (2013.01);
(Continued)

(58) Field of Classification Search
CPC ............... B41F 31/02; B41F 7/30; B41F 7/32
See application file for complete search history.

(56) References Cited

U.S. PATENT DOCUMENTS 2,551,582 A 5/1951 Carlson
2,753,796 A * 7/1956 Wood ........................ B41F 7/30 427/469
(Continued)

OTHER PUBLICATIONS

Co-pending U.S. Appl. No. 17/152,630, filed Jan. 19, 2021.
(Continued)

*Primary Examiner* — Ryan D Walsh
(74) *Attorney, Agent, or Firm* — Caesar Rivise, PC

(57) ABSTRACT

Ink-based digital printing systems useful for ink printing include a rotatable charge-retentive reimageable surface layer configured to receive a layer of fountain solution. The fountain solution is carried to the charge retentive surface by a fog or mist including fountain solution aerosol particles, dispersed gas particles, and charge directors that impart charge to the fountain solution aerosol particles. The charge-retentive reimageable surface may be charged to a uniform potential, and selectively discharged using an ROS according to image data to form an electrostatic latent image. The charged fountain solution adheres to portions of the charge-retentive reimageable surface according to the electrostatic latent image to form a fountain solution image thereon. The fountain solution image can be partially transferred to an imaging blanket, where the fountain solution image is inked. The resulting ink image may be transferred to a print substrate.

20 Claims, 5 Drawing Sheets

(51) Int. Cl.

| | |
|---|---|
| ***B41F 33/00*** | (2006.01) |
| ***B41F 7/02*** | (2006.01) |
| ***B41F 3/34*** | (2006.01) |
| ***B41F 7/32*** | (2006.01) |
| ***B41F 7/30*** | (2006.01) |

(52) U.S. Cl.
CPC ................ *B41F 7/32* (2013.01); *B41F 33/00* (2013.01); *B41M 1/06* (2013.01)

(56) References Cited

U.S. PATENT DOCUMENTS

| | | | | |
|---|---|---|---|---|
| 2,856,848 | A * | 10/1958 | Pritchard .................. | B41F 7/30 96/96 |
| 8,958,723 | B2 | 2/2015 | Liu | |
| 8,991,310 | B2 * | 3/2015 | Stowe ....................... | B41F 7/32 101/450.1 |
| 9,316,993 | B2 | 4/2016 | Veres et al. | |
| 10,744,754 | B2 | 8/2020 | Williams et al. | |
| 11,390,063 | B1 * | 7/2022 | Biegelsen .......... | G03G 15/0208 |
| 11,504,963 | B2 * | 11/2022 | Biegelsen .......... | G03G 15/0818 |
| 11,766,857 | B2 * | 9/2023 | Biegelsen ................. | B41F 7/02 399/131 |
| 11,787,167 | B2 * | 10/2023 | Biegelsen ................. | B41F 7/26 101/367 |
| 2012/0103212 | A1 * | 5/2012 | Stowe ................... | B41F 31/045 101/147 |
| 2012/0103221 | A1 * | 5/2012 | Stowe ..................... | B41F 35/02 101/483 |
| 2013/0033686 | A1 | 2/2013 | Stowe et al. | |
| 2014/0013980 | A1 | 1/2014 | Veres et al. | |
| 2017/0217150 | A1 | 8/2017 | Moore et al. | |

OTHER PUBLICATIONS

Co-pending U.S. Appl. No. 17/152,538, filed Jan. 19, 2021.
Co-pending U.S. Appl. No. 17/152,574, filed Jan. 19, 2021.
European Search Report to related European Patent Application No. 19185256.5 dated Jan. 13, 2020.

* cited by examiner

CHARGED PARTICLE GENERATION, FILTRATION, AND DELIVERY FOR DIGITAL OFFSET PRINTING APPLICATIONS

FIELD OF DISCLOSURE

The present disclosure is related to marking and printing systems, and more specifically to variable data lithography system using fog development of an electrographic image for creating a fountain solution image.

BACKGROUND

Offset lithography is a common method of printing today. For the purpose hereof, the terms "printing" and "marking" are interchangeable. In a typical lithographic process a printing plate, which may be a flat plate, the surface of a cylinder, belt and the like, is formed to have image regions formed of hydrophobic and oleophilic material, and non-image regions formed of a hydrophilic material. The image regions are regions corresponding to areas on a final print (i.e., the target substrate) that are occupied by a printing or a marking material such as ink, whereas the non-image regions are regions corresponding to areas on the final print that are not occupied by the marking material.

Digital printing is generally understood to refer to systems and methods of variable data lithography, in which images may be varied among consecutively printed images or pages. "Variable data lithography printing," or "ink-based digital printing," or "digital offset printing" are terms generally referring to printing of variable image data for producing images on a plurality of image receiving media substrates, the images being changeable with each subsequent rendering of an image on an image receiving media substrate in an image forming process. "Variable data lithographic printing" includes offset printing of ink images generally using specially-formulated lithographic inks, the images being based on digital image data that may vary from image to image, such as, for example, between cycles of an imaging member having a reimageable surface. Examples are disclosed in U.S. Patent Application Publication No. 2012/0103212 A1 (the '212 Publication) published May 3, 2012 based on U.S. patent application Ser. No. 13/095,714, and U.S. Patent Application Publication No. 2012/0103221 A1 (the '221 Publication) also published May 3, 2012 based on U.S. patent application Ser. No. 13/095,778.

A variable data lithography (also referred to as digital lithography) printing process usually begins with a fountain solution used to dampen a silicone imaging plate or blanket on an imaging drum. The fountain solution forms a film on the silicone plate that is on the order of about one (1) micron thick. The drum rotates to an exposure station where a high-power laser imager is used to remove the fountain solution at locations where image pixels are to be formed. This forms a fountain solution based latent image. The drum then further rotates to an inking station where lithographic-like ink is brought into contact with the fountain solution based latent image and ink transfers into places where the laser has removed the fountain solution. The ink is usually hydrophobic for better adhesion on the plate and substrate. An ultraviolet (UV) light may be applied so that photo-initiators in the ink may partially cure the ink to prepare it for high efficiency transfer to a print media such as paper. The drum then rotates to a transfer station where the ink is transferred to a print substrate such as paper. The silicone plate is compliant, so an offset blanket is not needed to aid transfer. UV light may be applied to the paper with ink to fully cure the ink on the paper. The ink is on the order of one (1) micron pile height on the paper.

The formation of the image on the printing plate/blanket is usually done with imaging modules each using a linear output high power infrared (IR) laser to illuminate a digital light projector (DLP) multi-mirror array, also referred to as the "DMD" (Digital Micromirror Device). The laser provides constant illumination to the mirror array. The mirror array deflects individual mirrors to form the pixels on the image plane to pixel-wise evaporate the fountain solution on the silicone plate to create the fountain solution latent image.

Due to the need to evaporate the fountain solution to form the latent image, power consumption of the laser accounts for the majority of total power consumption of the whole system. The laser power that is required to create the digital pattern on the imaging drum via thermal evaporation of the fountain solution to create a latent image is particularly demanding (30 mW per 20 um pixel, ~500 W in total). The high power laser module adds a significant cost to the system; it also limits the achievable print speed to about five meters per second (5 m/s) and may compromise the lifetime of the exposed components (e.g., micro-mirror array, imaging blanket, plate, or drum).

For the reasons stated above, and for other reasons which will become apparent to those skilled in the art upon reading and understanding the present specification, it would be beneficial to increase speed and lower power consumption in variable data lithography system.

SUMMARY

The following presents a simplified summary in order to provide a basic understanding of some aspects of one or more embodiments or examples of the present teachings. This summary is not an extensive overview, nor is it intended to identify key or critical elements of the present teachings, nor to delineate the scope of the disclosure. Rather, its primary purpose is merely to present one or more concepts in simplified form as a prelude to the detailed description presented later. Additional goals and advantages will become more evident in the description of the figures, the detailed description of the disclosure, and the claims.

The foregoing and/or other aspects and utilities embodied in the present disclosure may be achieved by providing a charged fountain solution aerosol development device useful for printing with an ink-based digital image forming apparatus having a rotatable imaging member with a charge-retentive surface bearing an electrostatic charged pattern and a rotatable inkable blanket downstream the imaging member and having a surface in rolling communication with the charge-retentive surface. It is understood that the rotatable inkable blanket downstream the imaging member may be in direct rolling communication with the charge-retentive surface or in indirect rolling communication with the charge-retentive surface via one or more intermediate transfer members (e.g., transfer rolls, drums, cylinders). The rotatable inkable blanket is configured to accept a patterned fountain solution latent image and transfer an ink image based on the electrostatic charged pattern to a substrate. The charged fountain solution aerosol development device includes a manifold through which the fountain solution aerosol particles traverse, and a particle sorter. When the aerosol particles are not charged during their formation, the charged fountain solution aerosol development device may include a particle charger configured to drive a flux of ions through the fountain solution aerosol particles to form a fog of charged fountain solution aerosol particles. Charged fountain solution aerosol particles may include undesirably (e.g., insufficiently, super-sufficiently, not sufficiently) charged particles and sufficiently charged particles. Charge sufficiency may be defined in terms of charge to mass ratio (C/M or Q/M) of aerosol particles. The particle sorter receives the fog of charged fountain solution aerosol particles and separates the undesirably charged particles from the charged fountain solution aerosol particles within the manifold resulting in filtered charged fountain solution aerosol particles that are desirably and sufficiently attracted to the electrostatic charged pattern to attach to the rotatable imaging member charge-retentive surface. In examples, fountain solution aerosol particles are desirably charged to be sufficiently attracted to the electrostatic charged pattern when the aerosol particles have a C/M resulting within a desired range (e.g., about 10-1000 charges per droplet, or about 50-200 charges per droplet, or about 100+/−10 charges per droplet where a unit charge has the magnitude of about one electron charge, and a droplet is greater than 0.1 micron, less than 5 microns, between about 0.5 and 2 microns or about 1 micron in diameter).

The flux of ions is not limited by direction through the flow of aerosol particles. For example, the flux of ions may be driven generally transverse to the flow of aerosol particles or in other directions with respect to the aerosol flow direction. The flux of ions may be traverse, for example, to help shield an ion generating corona wire vicinity from the fountain solution aerosol while enabling ion generation and transfer. In examples a shield, such as a shielding and/or fine grid membrane may be positioned around the corona wire to allow possible greater freedom of ion direction within the fountain solution aerosol flow. It is understood that driving a flux of ions is one way of charging fountain solution aerosol particles and other approaches are available and within the scope of the examples as readily understood by a skilled artisan.

According to aspects described herein, a fountain solution aerosol particle development device for delivering charged fountain solution aerosol particles onto a target is discussed. The aerosol particle development device includes an aerosol generator that generates a fog having fountain solution aerosol particles, a manifold through which the fog traverses, a particle charger that may drive a flux of ions through the fountain solution aerosol particles in the manifold to form the charged fountain solution aerosol particles in the fog, a particle sorter that separates undesirably charged particles from the charged fountain solution aerosol particles in the manifold, and a particle delivery baffle proximate the target to deposit the charged fountain solution aerosol particles from within the manifold about the target. In embodiments, the particle charger may be integrated with the aerosol generator, with the combination generating a fog of charged fountain solution aerosol particles.

According to aspects illustrated herein, an exemplary method for delivering charged fountain solution aerosol particles onto a target is discussed. The method includes generating a fog having fountain solution aerosol particles with an aerosol generator, with the fog traversing through a manifold, driving a flux of ions through the fountain solution aerosol particles to form the charged fountain solution aerosol particles in the fog within the manifold, separating undesirably charged aerosol particles from the charged fountain solution aerosol particles within the manifold with a particle sorter, and depositing the charged fountain solution aerosol particles from within the manifold about the target with a particle delivery baffle proximate the target.

In examples, the fountain solution aerosol particles have a narrow distribution of size and charge to mass ratio (C/M, also referred to herein as Q/m). Aerosols with higher/lower C/M would produce lower/higher fountain solution volumes, respectively, in the fountain solution latent image. Thus, by controlling the C/M and by controlling the degree of discharging of the charge latent image on the imaging member the volume of fountain solution may be controlled. The particles may have a diameter of around one (1) micron. A pixel of area 20×20 microns (corresponding to 1200 dpi imaging) and a target fountain solution thickness of around 200 nano-meters (nm) would need around 150 droplets/particles to provide the desired coverage. For the fountain solution patterning to yield 1200 dpi resolution, monodisperse droplets about one micron +/− a factor of 2 in diameter with a uniform C/M are beneficial. Supplying such particles to the imaging member and droplets to a transfer member is a considerable challenge due to both the size and charge requirements. Furthermore, ionized air should be prevented from compensating charges of the imaging member surface, and neutral fountain solution particles should be prevented from depositing on the surface. Examples discussed in greater detail below include a system for generating, sorting, and delivering charged liquid or solid aerosol particles of a particular size and charge to a charge-retentive reimageable surface of imaging member.

Exemplary embodiments are described herein. It is envisioned, however, that any system that incorporates features of apparatus and systems described herein are encompassed by the scope and spirit of the exemplary embodiments.

BRIEF DESCRIPTION OF THE DRAWINGS

Various exemplary embodiments of the disclosed apparatuses, mechanisms and methods will be described, in detail, with reference to the following drawings, in which like referenced numerals designate similar or identical elements, and.

DETAILED DESCRIPTION OF THE INVENTION

Figure 1:
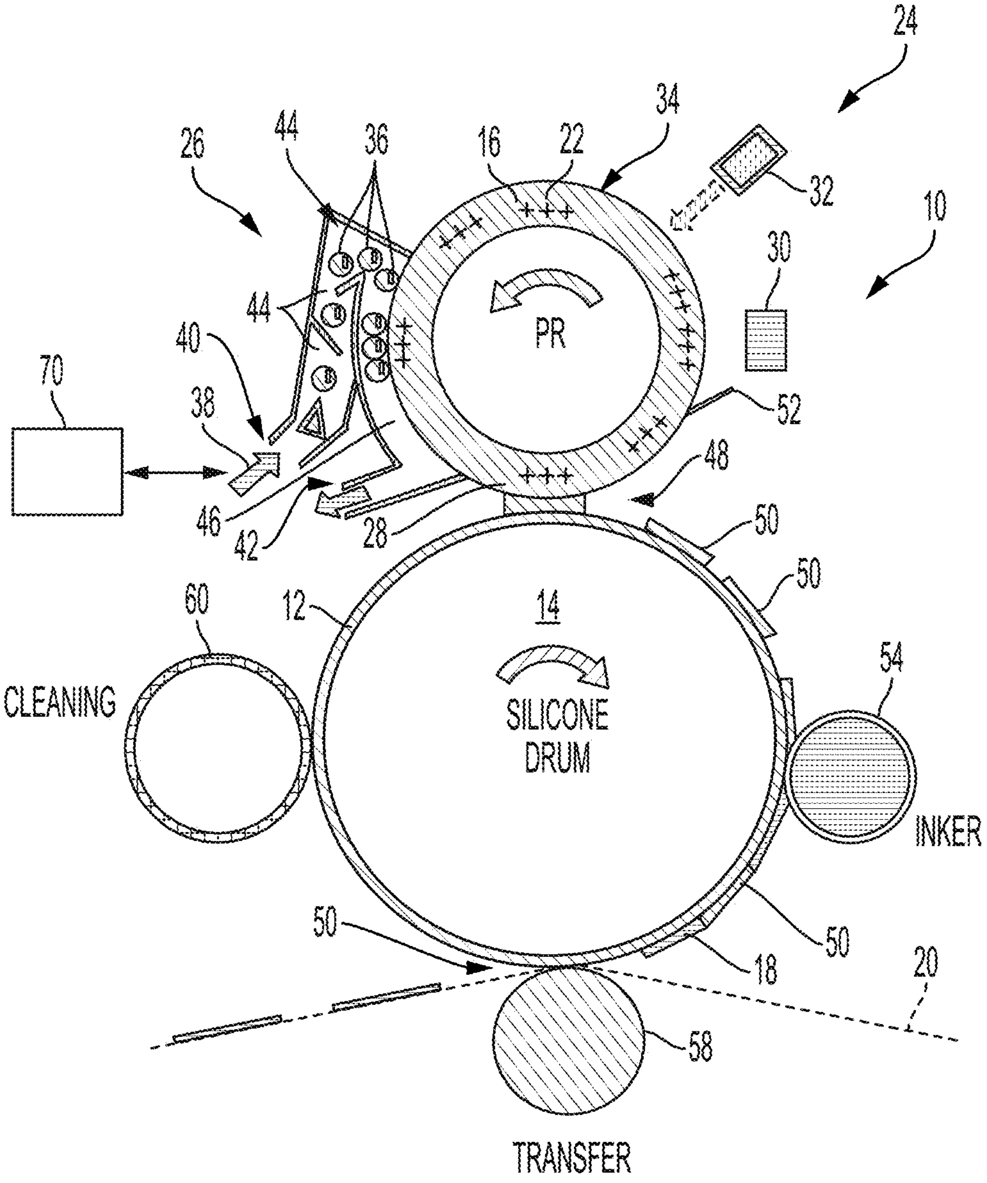
FIG. 1 illustrates a diagram of a related art ink-based digital printing system.

Illustrative examples of the devices, systems, and methods disclosed herein are provided below. An embodiment of the devices, systems, and methods may include any one or more, and any combination of, the examples described below. This invention may, however, be embodied in many different forms and should not be construed as limited to the embodiments set forth below. Rather, these exemplary embodiments are provided so that this disclosure will be thorough and complete, and will fully convey the scope of the invention to those skilled in the art. Accordingly, the exemplary embodiments are intended to cover all alternatives, modifications, and equivalents as may be included within the spirit and scope of the apparatuses, mechanisms and methods as described herein.

We initially point out that description of well-known starting materials, processing techniques, components, equipment and other well-known details may merely be summarized or are omitted so as not to unnecessarily obscure the details of the present disclosure. Thus, where details are otherwise well known, we leave it to the application of the present disclosure to suggest or dictate choices relating to those details. The drawings depict various examples related to embodiments of illustrative methods, apparatus, and systems for inking from an inking member to the reimageable surface of a digital imaging member.

When referring to any numerical range of values herein, such ranges are understood to include each and every number and/or fraction between the stated range minimum and maximum. For example, a range of 0.5-6% would expressly include the endpoints 0.5% and 6%, plus all intermediate values of 0.6%, 0.7%, and 0.9%, all the way up to and including 5.95%, 5.97%, and 5.99%. The same applies to each other numerical property and/or elemental range set forth herein, unless the context clearly dictates otherwise.

The modifier "about" used in connection with a quantity is inclusive of the stated value and has the meaning dictated by the context (for example, it includes at least the degree of error associated with the measurement of the particular quantity). When used with a specific value, it should also be considered as disclosing that value. For example, the term "about 2" also discloses the value "2" and the range "from about 2 to about 4" also discloses the range "from 2 to 4."

The term "controller" or "control system" is used herein generally to describe various apparatus such as a computing device relating to the operation of one or more device that directs or regulates a process or machine. A controller can be implemented in numerous ways (e.g., such as with dedicated hardware) to perform various functions discussed herein. A "processor" is one example of a controller which employs one or more microprocessors that may be programmed using software (e.g., microcode) to perform various functions discussed herein. A controller may be implemented with or without employing a processor, and also may be implemented as a combination of dedicated hardware to perform some functions and a processor (e.g., one or more programmed microprocessors and associated circuitry) to perform other functions. Examples of controller components that may be employed in various embodiments of the present disclosure include, but are not limited to, conventional microprocessors, application specific integrated circuits (ASICs), and field-programmable gate arrays (FPGAs).

The terms "media", "print media", "print substrate" and "print sheet" generally refers to a usually flexible physical sheet of paper, polymer, Mylar material, plastic, or other suitable physical print media substrate, sheets, webs, etc., for images, whether precut or web fed. The listed terms "media", "print media", "print substrate" and "print sheet" may also include woven fabrics, non-woven fabrics, metal films, and foils, as readily understood by a skilled artisan.

The term "image forming device", "printing device" or "printing system" as used herein may refer to a digital copier or printer, scanner, image printing machine, xerographic device, electrostatographic device, digital production press, document processing system, image reproduction machine, bookmaking machine, facsimile machine, multi-function machine, or generally an apparatus useful in performing a print process or the like and can include several marking engines, feed mechanism, scanning assembly as well as other print media processing units, such as paper feeders, finishers, and the like. A "printing system" may handle sheets, webs, substrates, and the like. A printing system can place marks on any surface, and the like, and is any machine that reads marks on input sheets; or any combination of such machines.

The term "fountain solution" or "dampening fluid" refers to dampening fluid that may coat or cover a surface of a structure (e.g., imaging member, transfer roll) of an image forming device to affect connection of a marking material (e.g., ink, toner, pigmented or dyed particles or fluid) to the surface. The fountain solution may include water optionally with small amounts of additives (e.g., isopropyl alcohol, ethanol) added to reduce surface tension as well as to lower evaporation energy necessary to support subsequent laser patterning. Low surface energy solvents, for example volatile silicone oils, can also serve as fountain solutions. Fountain solutions may also include wetting surfactants, such as silicone glycol copolymers. The fountain solution may be non-aqueous including, for example, silicone fluids (such as D3, D4, D5, OS10, OS20, OS30 and the like), Isopar fluids, and polyfluorinated ether or fluorinated silicone fluid.

The term "aerosol" refers to a suspension of solid and/or liquid particles in a gas. An aerosol may include both the particles and the suspending gas, which may be air, another gas or mixture thereof. The solids and/or liquid particles are sufficiently large for sedimentation, for example, as fountain solution on an imaging member surface. For example, solid or liquid particles may be greater than 0.1 micron, less than 5 microns, between about 0.5 and 2 microns and about 1 micron in diameter.

Although embodiments of the invention are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. For example, "a plurality of stations" may include two or more stations. The terms "first," "second," and the like, herein do not denote any order, quantity, or importance, but rather are used to distinguish one element from another. The terms "a" and "an" herein do not denote a limitation of quantity, but rather denote the presence of at least one of the referenced item.

FIG. 1 depicts an exemplary ink-based digital image forming apparatus 10 for variable data lithography including fog development of a charged fountain solution aerosol that forms a latent digital image created electrographically. The latent digital image is transferred to an inking blanket 12 of a transfer member 14 (e.g., roller, cylinder, drum) downstream an imaging member 16 for subsequent printing of an associated ink image 18 onto a print substrate 20. The imaging member 16 shown in FIG. 1 is a drum, but this exemplary depiction should not be read in a manner that precludes the imaging member 16 being a blanket, a belt, or of another known configuration. The image forming apparatus 10 includes the rotatable imaging member 16 having an arbitrarily reimageable surface 22 as different images can be created on the surface layer. In examples, the surface 22 is a charge-retentive surface such as but not limited to a photoreceptor surface or a dielectric surface. The reimageable charge-retentive surface 22 may be part of the drum or formed over a structural mounting layer that may be, for example, a cylindrical core, or one or more structural layers over a cylindrical core. The reimageable charge-retentive surface may be formed of a relatively thin layer over the mounting layer, a thickness of the relatively thin layer being selected to balance charge retaining performance, durability and manufacturability. The imaging member 16 is surrounded by an imaging station 24 configured to form an electrostatic charged pattern of a latent image on the imaging member surface 22, and an aerosol development device 26 that provides a fog of charged fountain solution aerosol particles that are attracted to the electrostatic charged pattern.

According to examples, fountain solution latent images 28 are created (e.g., xerographically, ionographically) on imaging member 16 and transferred to the inking blanket 12 for further processing. At the imaging station 24, a charging device 30 charges the imaging member surface 22, for example by corona discharge from a high voltage power source via a conductor of the charging device adjacent the charge-retentive imaging member surface 22. In electrography or xerography an imager 32 having a low power light source (e.g., a laser with a conventional ROS scanner, LED bar) selectively discharges select portions or pixels of the surface 22 according to image data to generate an electrostatic charged pattern 34 disposed on the surface of the imaging member 20. In ionography the imager 32 includes an image projection head for projecting ion beams, i.e., ions of a given polarity, onto the charge-retentive surface 22 after the surface is charged by the charging device 30. The surface 22 shown could be a photoreceptor, but when the application is ionographically created, an insulating surface could be used to create the charge image.

The aerosol development device 26 presents a charged patterned uniform layer of fountain solution (e.g., silicone fluids, such as D4, D5, Isopar G, Isopar H, Dowsil OS20, Dowsil OS30, L5; water/IPA mixtures, hydrophilic fluids, and mixtures thereof) aerosol particles 36 in solid or liquid particle form onto the surface 22 of the imaging member 16. The fountain solution aerosol particles 36 are configured to adhere to portions of the imaging member surface 22 according to the electrostatic charged pattern 34 developed thereon by imager 32. In examples, charged fountain solution aerosol particles 36 of opposite polarity of the imaging member surface 22 are deposited onto the electrostatic charged pattern 34, forming a fountain solution latent image 28 on the imaging member surface. In other examples, charged fountain solution aerosol particles 36 of the same polarity as the imaging member surface 22 would be deposited on the neutral pixels thereof.

The aerosol development device 26 atomizes and charges fountain solution 38 into charged fountain solution aerosol particles 36 that enter an inlet port 40. In examples, a pump may supply fountain solution from a container housing the fountain solution to an aerosol generator (e.g., a nebulizer) at a steady, controlled rate. The fountain solution may contain charge control agents (e.g., surfactants, polymer solution, salts), to assist particle charging, as well understood by a skilled artisan. The aerosol development device 26 further includes a manifold having walls 62 defining a chamber 44 and a radially enlarged region 46 near the imaging member surface 22 where a fog of charged fountain solution aerosol particles 36 may carry the atomized fountain solution to the electrostatic charged pattern 34 on the surface of imaging member 16.

A carrier gas such as nitrogen, added in a predetermined amount, may be introduced into the developer unit chamber 44 via inlet port 40 to carry the atomized fountain solution aerosol particles 36 to the surface 22 of imaging member 16 as a gas mixture, where they may be attracted to the electrostatic charged pattern 34 and bond to the charge-retentive reimageable surface 22 and form a fountain solution latent image 28. The gas mixture transporting the atomized fountain solution aerosol particles includes the carrier gas and a controlled partial pressure of fountain solution. This partial pressure of fountain solution may solely originate from evaporated fountain solution or a controlled additional vaporized fountain solution. An increase in the partial pressure of the fountain solution will slow down the evaporation from the fountain solution droplets. The partial pressure may be modified, for example, by the controller adding vaporized fountain solution to the gas mixture, as well understood by a skilled artisan.

The surface charge density (created by charging device 30) of the latent image attracts a volume of fountain solution aerosol particles 36 until the surface charge is optionally neutralized or partially neutralized by the fog charged aerosol. Adhesion forces with the imaging member 16 and each other will cause the aerosol particles to remain on the surface 22 of the imaging member.

Aerosol particles 36 do not bond to the surface 22 of imaging member 16 where no latent image charge resides. The aerosol particles 36 can also be electrostatically repelled from uncharged regions of the electrostatic charged pattern 34, for example, via voltage applied to walls of the development device 26. Aerosol particles 36 that do not bond to the imaging member surface 22 may exit the developer unit 20 via outlet port 42 and flow back to the fountain solution container. A vapor vacuum or air knife (not shown) may be positioned adjacent the downstream side of the radially enlarged region 46 near the outlet port 42 to collect unattached aerosol particles and thus avoid leakage of fountain solution into the environment. Reclaimed fountain solution particles can also be condensed and filtered as needed for reuse as understood by a skilled artisan to help minimize the overall use of fountain solution by the image forming device 10.

The transfer member 14 may be configured to form a fountain solution image transfer nip 48 with the imaging member 16. A fountain solution image produced by the developer unit 26 and imaging station 24 on the surface 22 of the imaging member 16 is transferred to the inking blanket 12 of the transfer member 14 under pressure at the loading nip 48. In particular, a light pressure (e.g., a few pounds, greater than 0.1 lbs., less than 10 lbs., about 1-4 lbs.) may be applied between the surface of the inking blanket 12 and the imaging member surface 22. At the fountain solution transfer nip 48, the fountain solution latent image 28 splits as it leaves the nip, and transfers a split layer of the fountain solution latent image, referred to as the transferred fountain solution latent image 50, to the transfer member surface (i.e., inking blanket 12). The amount of fountain solution transferred may be adjusted by contact pressure adjustments of nip 48. For example, a split fountain solution latent image 50 of about one (1) micrometer or less may be transferred to the inking blanket surface. Like the imaging member 16, the transfer member 14 may be electrically biased to enhance loading of the dampening fluid latent image at the loading nip 48.

After transfer of the fountain solution latent image from the imaging member 16, the imaging member 16 may be cleaned in preparation for a new cycle by removing dampening fluid and solid particles from the surface at a cleaning station 52. Various methods for cleaning the imaging member surface 22 may be used, for example an air knife and/or sponge, as well understood by a skilled artisan.

After the fountain solution latent image 50 is transferred to the transfer member 14, ink from an inker 54 is applied to the inking blanket 12 to form an ink pattern or image 18. The inker 54 is positioned downstream fountain solution transfer nip 48 to apply a uniform layer of ink over the transferred fountain solution latent image 50 and the inking blanket 12. While not being limited to a particular theory, the ink pattern or image 18 may be a negative of or may correspond to the fountain solution pattern. For example, the inker 54 may deposit the ink to the evaporated pattern representing the imaged portions of the reimageable surface 26, while ink deposited on the unformatted portions of the fountain solution will not adhere based on a hydrophobic and/or oleophobic nature of those portions. The ink image 18 may be transferred to print media or substrate 20 at an ink image transfer nip 56 formed by the transfer member 14 and a substrate transport roll 58. The substrate transport roll 58 may urge the print substrate 20 against the transfer member surface, or inking blanket 12, to facilitate contact transfer of the ink image 18 from the transfer member 14 to the print substrate.

After transfer of the ink image 18 from the transfer member 14 to the print media 20, residual ink may be removed by a cleaning device 60. This residual ink removal is most preferably undertaken without scraping or wearing the imageable surface of the imaging blanket 12. Removal of such remaining fluid residue may be accomplished through use of some form of cleaning device 60 adjacent the imaging blanket 12 between the ink image transfer nip 56 and the fountain solution transfer nip 48. Such a cleaning device 20 may include at least a first cleaning member such as a sticky or tacky roller in physical contact with the imaging blanket surface, with the sticky or tacky roller removing residual fluid materials (e.g., ink, fountain solution) from the surface. The sticky or tacky roller may then be brought into contact with a smooth roller (not shown) to which the residual fluids may be transferred from the sticky or tacky member, the fluids being subsequently stripped from the smooth roller by, for example, a doctor blade or other like device and collected as waste.

It is understood that the cleaning device 60 is one of numerous types of cleaning devices and that other cleaning devices designed to remove residual ink/fountain solution from the surface of imaging blanket 12 are considered within the scope of the embodiments. For example, the cleaning device could include at least one roller, brush, web, belt, tacky roller, buffing wheel, etc., as well understood by a skilled artisan. It is also understood that the cleaning device 60 may be more sophisticated or aggressive at removing residual fluids from imaging blanket 12 that the cleaning station 52 is at removing fountain solution from the surface 22 of the imaging member 16. Cleaning station 52 is not concerned with removing residual ink, and merely is designed to remove fountain solution and associated contaminates from the surface 22.

The exemplary ink-based digital image forming devices and operations thereof may be controlled by a controller 70 in communication with the image forming devices and parts thereof. For example, the controller 70 may control the imaging station 24 to create electrostatic charged patterns of latent images on the imaging member surface 22. Further, the controller 70 may control the aerosol development device 26 or other aerosol development devices discussed in greater detail below to provides the fog of charged fountain solution aerosol particles that are attracted to the electrostatic charged pattern. The controller 70 may be embodied within devices such as a desktop computer, a laptop computer, a handheld computer, an embedded processor, a handheld communication device, or another type of computing device, or the like. The controller 70 may include a memory, a processor, input/output devices, a display and a bus. The bus may permit communication and transfer of signals among the components of the controller 70 or computing device, as will be described in greater detail below.

Figure 2:
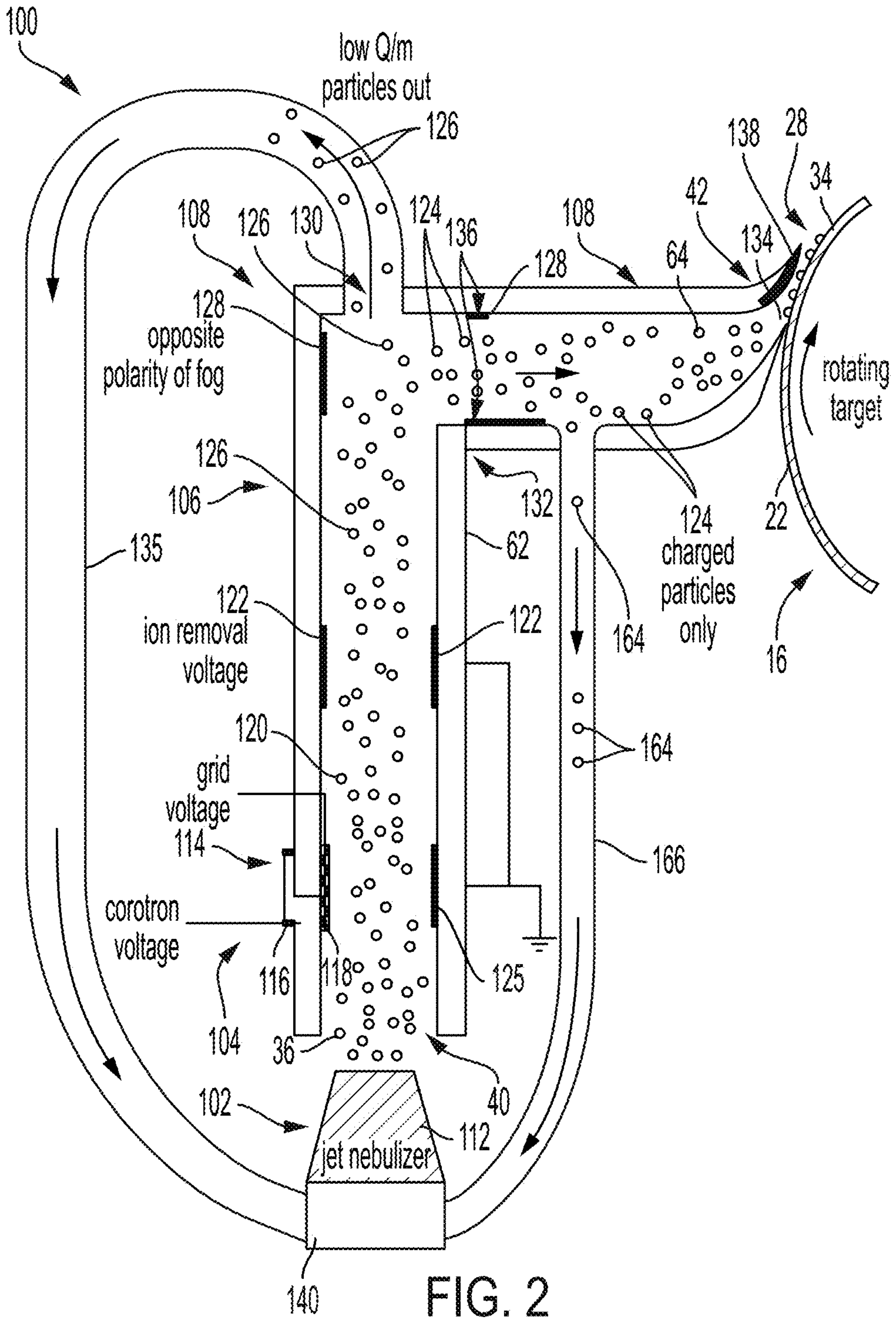
FIG. 2 is a side view partially in cross of a fountain solution aerosol particle deposition system in accordance with examples.

FIG. 2 depicts a fountain solution aerosol development device 100 in accordance with examples of the embodiments. The development device 100 is similar to the aerosol development device 26 discussed above. For example, the fountain solution aerosol development device 100 presents a charged patterned layer of fountain solution (e.g., silicone fluids, such as D4, D5, Isopar G, Isopar H, Dowsil OS20, Dowsil OS30, L5; water/IPA mixtures, hydrophilic fluids, and mixtures thereof) in aerosol (i.e., solid or liquid) particle form 64 onto surface 22 of imaging member 16. The fountain solution aerosol particles 36 are configured to adhere to portions of the imaging member surface 22 according to the electrostatic charged pattern 34 developed thereon by imager 32.

The development device 100 is a charged fountain solution aerosol particle development device useful for printing with the ink-based digital image forming device 10 (FIG. 1) having rotatable imaging member 16 with a charge-retentive reimageable surface 22 bearing an electrostatic charged pattern 34 and a rotatable inking blanket 12 downstream the imaging member. The rotatable inking blanket 12 (or belt) has a surface in rolling communication with the charge-retentive surface 22 and may be conformable to accept the charged patterned fountain solution latent image 28 and transfer an ink image 18 corresponding to the electrostatic charged pattern 34 to a substrate 20. The inking blanket 12 may include, for example, hydrophobic polymers such as silicones, partially or fully fluorinated fluorosilicones and FKM fluoroelastomers. Other materials may be employed, including blends of polyurethanes, fluorocarbons, polymer catalysts, platinum catalyst, hydrosilyation catalyst, etc. The surface may be configured to conform to a print substrate on which an ink image is printed. To provide effective wetting of fountain solutions such as water-based dampening fluid, the silicone surface need not be hydrophilic, but may be hydrophobic. The inking blanket 12 may have high electrical resistivity and finite conductivity to avoid charge buildup on the blanket.

While not being limited to a particular theory, examples form a fog of fountain solution droplets/particles that are charged, sort the particles into fountain solution particles having roughly the same C/M, and bring the sorted charged fountain solution particles within the desired C/M range into proximity of an electrostatic charged image pattern 34 on a charge retentive surface 22 of imaging member 16. The sorted charged fountain solution particles bond to the surface 22 at the charged image pattern to develop that image into a fountain solution latent image. In examples, the fountain solution aerosol development device 100 may include a manifold having walls 62 defining a developer unit chamber 44 and at least one of an aerosol generator 102 that may have control over evaporation or sublimation, a particle charger 104, a particle sorter 106, and a particle delivery baffle 108. The aerosol generator 102 generates a fog 110 having fountain solution aerosol particles 36.

Referring to FIG. 2, aerosol particles 36 may be generated by the aerosol generator 102 including a jet nebulizer 112 and charged by particle charger 104, which may be or include a scorotron 114 (e.g., corona wire 116 and grid 118) that drives a flux of ions through the fountain solution aerosol particles to form charged fountain solution particles 120. While not being limited to particular values, the scorotron voltage may be greater than 1 kV, less than 20 kV, or about 6-10 kV. Further, the corona wire 116 may have a current (e.g., less than about 10 μA/cm, less than 2 μA/cm, about 1 μA/cm to 20 nA/cm, about 1.5 μA/60 mm or 250 nA/cm) in the cross-process direction, and grid 118 voltage may be greater than 0.1 kV, less than 10 kV or about 0.5-1 kV. The corona wire 116 and ground plate 125 opposite the corona wire may be separated by a distance of greater than 1 mm, less than 50 mm or about 5-10 mm. After charging aerosol particles 36 with the scorotron 114, excess ionized air may be removed, for example using a pair of electrodes 122 to generates a field strong enough to deflect individual ions, but not strong enough to affect the more massive charged particles 120. For example, the pair of ion removal electrodes 122 may generate a field of deionized air or lower ionized air.

The charged particles 120 may then be sorted into sufficiently charged particles 124 having a desirable C/M ratio and undesirably charged particles 126 having an insufficient or super-sufficient C/M ratio. For example, the charged particles 120 may be sorted by charge-to-mass ratio (C/M) using an electric field, for example via electrodes 128. The electrodes 128 may have a polarity opposite the polarity from the particle charger 104, which may force desirable C/M sufficiently charged particles 124 around a corner 120 of the aerosol development device 100. This force will not be sufficient to deflect neutral or large diameter particles (insufficiently charged particles 126), and they may continue in a straight or nearly straight path and exit the aerosol development device 100 at exhaust port 130. The sufficiently charged particles 124 are deflected around corner 132 and flow within the delivery baffle 108 for deposition onto a target, such as the rotating electrostatic charged pattern 34 through a narrow gap 134 at the outlet port 42 of the particle delivery baffle 108. The filtered out insufficiently charged particles 126 may flow out of the manifold walls 62 and away from the baffle aerosol flow, for example through a recovery conduit 135 and back to the fountain solution source or fluid reservoir 140 as fountain solution droplets for recycled use. Filtered out super-sufficiently charged particles 164 may also be separated from sufficiently charged particles 124, and may also flow out of the manifold walls 62 and away from the baffle aerosol flow. In examples, the super-sufficiently charged particles 164 may also be recycled via a second recovery conduit 166 back to fluid reservoir 140.

While not being limited to a particular theory, the baffle 108 may be held at some intermediate voltage to drive particles toward the charged pixels on the reimageable surface and away from the uncharged pixels. One of the electrodes 128 coupled to the baffle 108 may be a ring electrode 136. The ring electrode 136 may be a grounded ring electrode. As can be seen in FIG. 2, the ring electrode 136 may be extended within the baffle 108 to help collect overly charged or super-sufficiently charged particles 164.

As discussed above, fountain solution aerosol particles 36 should not bond to the surface 22 of imaging member 16 where no latent image charge resides. To aid in this desired result, the upper lip of the aerosol development device 100 outlet port 42 proximate to imaging member surface 22 may be shown held at a voltage between the voltage of charged pixel areas and the voltage of discharged pixel areas of the electrostatic charged pattern of the image surface. Then charged aerosol particles 124 may be attracted to the surface 22 near charged pixels of the electrostatic charged pattern 34 and attracted away from the imaging member surface near discharged pixels at non-patterned areas. For example, the outlet port 42 may have a counter electrode 138 configured to help release charged fountain solution particles 124 away from discharged sections or pixels of the imaging member surface 22. Counter electrode 138 may have a potential set to a value between (e.g., about halfway between) the charged and discharged values of the charged image pattern area on the rotating surface 22.

The high Q/m sufficiently charged particles 124 may also be delivered to the target by different approaches, such as, blowing the fog 110 and charged particles onto the target or having the fog and charged particles flow parallel to the target using flow directors. Such flow directors may include the particle delivery baffle 108 narrow gap 134, a nozzle, air knives, or counter-rotating rollers/belts with a narrow gap.

The fountain solution aerosol development devices of the examples are not limited to a particular structure, as variations are contemplated since there may be multiple ways of achieving steps of the exemplary process. For example, the aerosol generator 102 that may generate a fog 110 having fountain solution aerosol particles 36 may include a jet nebulizer 112 and/or other types of aerosol generators, including but not limited to T-jet, Y-jet, swirl, or high pressure spray nozzles. Piezo-based atomizers such as vibrating mesh or ultrasonic nebulizers may also be used. The aerosol generator 102 may be tuned or selected to produce a fairly narrow distribution of fountain solution droplet diameters, for example, about one micron plus/minus a factor of two (e.g., about 0.5 μm-2.0 μm). In examples the aerosol generator 102 generates a fog of fountain solution droplets, which may be sourced in a fountain solution reservoir 140. The aerosol generator 102 includes a high voltage source but may charge the aerosol particles 36 by multiple ways, for example, as shown herein, by corona (ionized air) or induction during or after particle generation.

The particle sorter 106 may sort particles entrained in air and remove ionized air using electrical fields and air flow. A charged particle feels a field-dependent force due to an applied electrical field, and a diameter-dependent force due to the velocity relative to the surrounding fluid. Sorting may occur by applying an electrical field (e.g., opposite polarity) across the path of the aerosol particles 36 in order to deflect highly charged particles (e.g., sufficiently charged particles 124), or by blowing air or another gas across the path of the particles 36 to deflect smaller diameter particles (e.g., less than 5 μm, less than the desired diameter particles) with the diameter being independent of the charge. Magnetic fields may also be used to deflect high speed, high Q/m sufficiently charged particles 124, as well understood by a skilled artisan.

As noted above, a carrier gas (e.g., nitrogen, pressurized air) may be supplied into input port 40 to help carry the fog 110 of aerosol particles 36 or droplets as a directed flow from the aerosol generator 102 through the developer unit chamber 44 and out of the delivery baffle 108 for delivery to the target (e.g., electrostatic charged pattern 34). It should be noted that the fog 110 once generated can be frozen. For example fountain solution like D4 freezes at 17.5 C. So if a carrier gas like nitrogen and the chamber 44 of the fountain solution aerosol development devices are maintained below 17 C, aerosol droplets may solidify as frozen aerosol particles. Such frozen particles can be useful in controlling the capillary spreading forces of a liquid on a surface like the inking blanket 12 surface or the surface 22 of imaging member 12. If such particles remain frozen all the way to the fountain solution transfer nip 48 between the charge-retentive reimageable surface 22 and the inking blanket 12, nip pressure therebetween can act to melt the fountain solution particles and wet the inking blanket. In examples, a heat source may be used to melt the frozen fountain solution particles just before or after transfer to the inking blanket 12. In examples, frozen fountain solution particles are melted to droplets before an inking.

The exemplary fountain solution aerosol development devices may have control over evaporation or sublimation, for example, by depressing evaporation or sublimation rates by freezing droplets, using fountain solutions with low saturation pressure, maintaining dense clouds of particles such that the saturation pressure of fountain solution particles in the clouds or fog is reached quickly, and/or adding fountain solution vapor to the fog to limit evaporation. By controlling, such as with controller 70, particle charge to mass ratio, the particle volume parameters and charge density of the charge-retentive surface 22, a desired thickness of fountain solution can controllably coat the latent image regions on the imaging member 16, as well understood by a skilled artisan.

Figure 3:
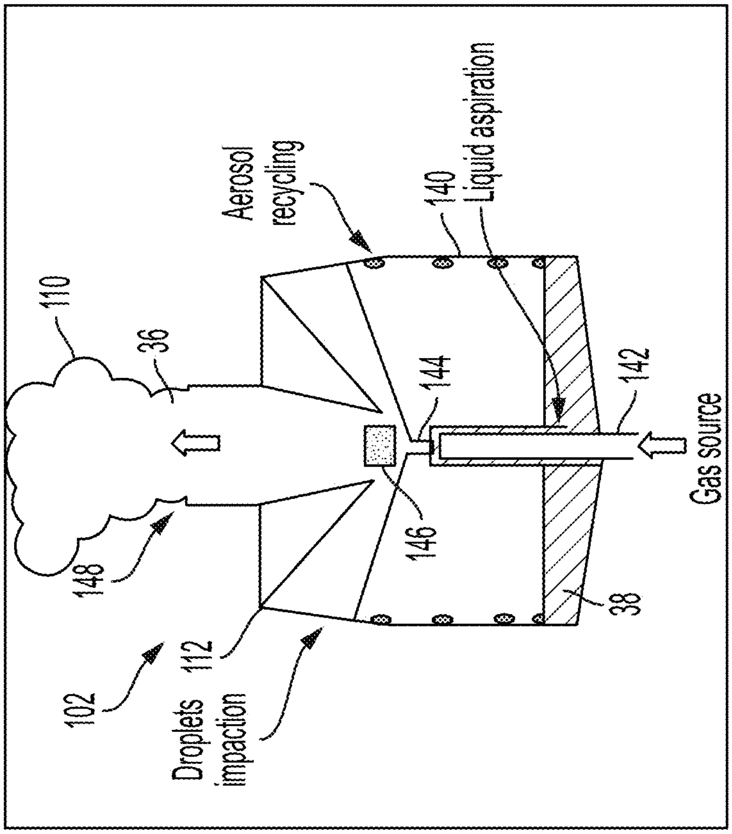
FIG. 3 is a side view partially in cross of an exemplary fountain solution aerosol generator.

Having thus outlined several examples of printing apparatus and processes, and described various sequences of operation, reference is now made to FIG. 3 showing a further example with certain elements omitted for simplicity. In particular, FIG. 3 depicts another example of an aerosol generator 102 as an aerosol generator jet nebulizer 112 that generates fog 110 having fountain solution aerosol particles 36 in accordance with examples of the embodiments. The jet nebulizer 112 is an atomizer having a fluid reservoir 140 for housing fountain solution 38. The reservoir 140 may be connected by tubing 142 to a supply of compressed gas (e.g., compressed air, oxygen, nitrogen) that flows at high velocity through the fountain solution to turn it into fountain solution aerosol stream 144 via atomisation. A baffle 146 may be in line with the flow of the fountain solution aerosol stream 144 such that the aerosol stream is impelled against the baffle 146 for nebulization. The baffle 146 may cause larger fountain solution aerosol particles to coalesce with impaction against fluid reservoir walls, and collect to be recycled in the reservoir 140. Smaller particles (e.g., about 1 micron) may flow through outlet 148 of the reservoir and into the developer unit chamber 44 (FIG. 2) as fountain solution aerosol particles 36 for charging thereof and delivery to an electrostatic charged pattern 34 on the charge retentive reimageable surface 22.

Figure 4:
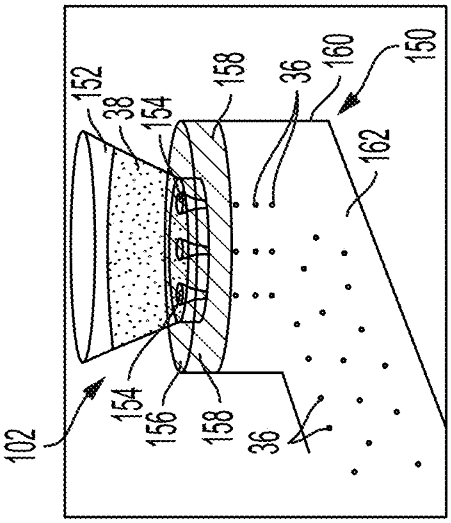
FIG. 4 is a side view partially in cross of another exemplary fountain solution aerosol generator.

FIG. 4 depicts another example of the aerosol generator 102. In particular, the aerosol generator includes a vibrating mesh nebulizer 150 having a fluid reservoir 152 for housing fountain solution 38. The fluid reservoir 152 has apertures 154 through its bottom for the fountain solution to leak into a mesh membrane 156 having tiny holes 158 (e.g., laser drilled holes). The mesh membrane 156 may vibrate (e.g., via a piezo-electric actuator (not shown)) and draw fountain solution through the tiny holes like a pump. This vibration thereby pressures out an aerosol mist of very fine fountain solution particles or droplets 36 through the tiny holes. The mesh membrane 156 may be seated in or otherwise connected to a tube 160 defining a chamber 162 therein via which the fountain solution particles 36 may exit into the developer unit chamber 44 (FIG. 2) for charging thereof and delivery to an electrostatic charged pattern 34 (FIG. 1) on the charge retentive reimageable surface 22.

Figure 5:
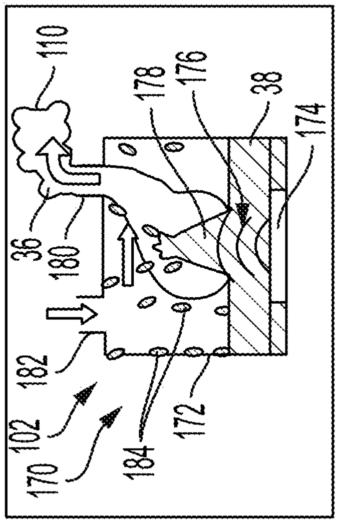
FIG. 5 is a perspective view partially in cross of a fountain solution aerosol generator in accordance with examples.

FIG. 5 depicts yet another example of the aerosol generator 102, here including an ultrasonic nebulizer 170 having fountain solution 38 in a fluid reservoir 172. A piezoelectric element 174 (e.g., piezoelectric crystal, electronic oscillator, metal plate) in contact with the fluid reservoir is mechanically vibrated at a high frequency (e.g., ultrasonic) with sufficient intensity to create acoustic beams 176 and standing ultrasonic waves 178 on the surface of the fountain solution overlying the piezoelectric element and produce a fog 110 or mist of fountain solution aerosol particles 36. The particles may remain within the reservoir 172 until they are swept out of reservoir outlet 180, in this example by air shown by arrows in FIG. 5 flowing into the fluid reservoir via inlet 182. Larger aerosol particles 184 fall back into the fountain solution 38 and are thereby recycled. The fountain solution aerosol particles 36 that flow out the outlet 180 may enter the developer unit chamber 44 (FIG. 2) for charging thereof and delivery to an electrostatic charged pattern 34 (FIG. 1) on the charge retentive reimageable surface 22.

FIGS. 3-5 illustrate different approaches for forming a fog of fountain solution aerosol particles. It is understood that the aerosol generator 102 is not limited to a particular structure, and other approaches are available. For example, fountain solution aerosol droplets may be formed by depositing fountain solution on a patterned substrate which has regular, uniform divots or patterned, variable surface energy. Then the deposited fountain solution may be removed from the surface by scraping or using electrical fields to form an aerosol. These approaches discussed above will form liquid aerosol droplets, and the droplets may be frozen afterwards to reduce evaporation. In the example discussed above in this paragraph, to ease removal the deposited fountain solution droplets may also be frozen on the surface prior to removal and then released as aerosol particles by scraping or using electrical fields.

Figure 6:
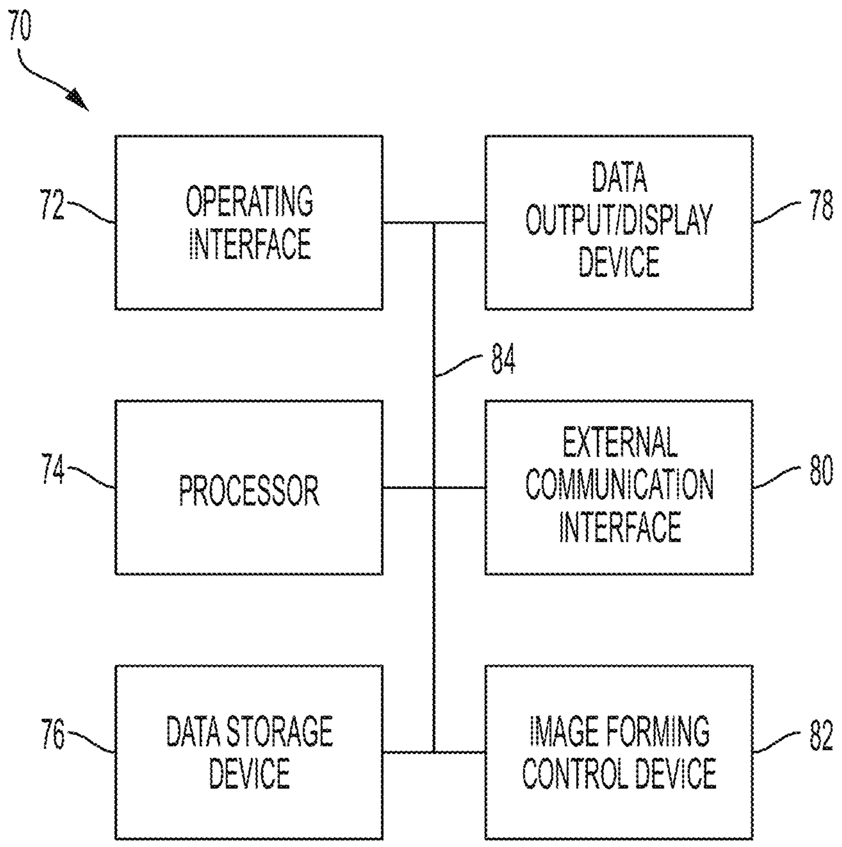
FIG. 6 is a block diagram of a controller with a processor for executing instructions to automatically control components of the digital image forming device and fountain solution aerosol development device depicted in FIGS. 1-5.

FIG. 6 illustrates a block diagram of the controller 70 for executing instructions to automatically control the ink-based digital image forming device 10 including the fountain solution aerosol development devices 26, 100 and components thereof. The exemplary controller 70 may provide input to or be a component of a controller for executing the image formation method in a system such as that depicted in FIGS. 1-5 and described in greater detail below in FIG. 7.

The exemplary controller 70 may include an operating interface 72 by which a user may communicate with the exemplary control system. The operating interface 72 may be a locally-accessible user interface associated with the digital image forming device 10. The operating interface 72 may be configured as one or more conventional mechanism common to controllers and/or computing devices that may permit a user to input information to the exemplary controller 70. The operating interface 72 may include, for example, a conventional keyboard, a touchscreen with "soft" buttons or with various components for use with a compatible stylus, a microphone by which a user may provide oral commands to the exemplary controller 70 to be "translated" by a voice recognition program, or other like device by which a user may communicate specific operating instructions to the exemplary controller. The operating interface 72 may be a part or a function of a graphical user interface (GUI) mounted on, integral to, or associated with, the digital image forming device 10 with which the exemplary controller 70 is associated.

The exemplary controller 70 may include one or more local processors 74 for individually operating the exemplary controller 70 and for carrying into effect control and operating functions for image formation onto a print substrate 20, including but not limited to forming an electrostatic charged pattern 34 on the charge retentive reimageable surface 22, forming a fog 110 of charged fountain solution aerosol particles 36, depositing the charged fog onto the charge retentive reimageable surface 22 to form fountain solution latent image 28, transferring the latent image from the imaging member 16 to an inking blanket 12 surface of an inked image transfer member 14, depositing a layer of ink over the latent image to form an ink image 18 and transferring the ink image from the inking blanket to print substrate 20. Processor(s) 74 may include at least one conventional processor or microprocessor that interprets and executes instructions to direct specific functioning of the exemplary controller 70, and control of the image forming process with the exemplary controller.

The exemplary controller 70 may include one or more data storage devices 76. Such data storage device(s) 76 may be used to store data or operating programs to be used by the exemplary controller 70, and specifically the processor(s) 74. Data storage device(s) 76 may be used to store information regarding, for example, a current image for patterning by the imaging station 24, desired and actual particle charge to mass ratios, desired and actual particle volume parameters, charge density of the charge-retentive surface 22, correction look-up tables, and digital image information with which the digital image forming device 10 is associated.

The data storage device(s) 76 may include a random access memory (RAM) or another type of dynamic storage device that is capable of storing updatable database information, and for separately storing instructions for execution of image forming operations by, for example, processor(s) 74. Data storage device(s) 76 may also include a read-only memory (ROM), which may include a conventional ROM device or another type of static storage device that stores static information and instructions for processor(s) 74. Further, the data storage device(s) 76 may be integral to the exemplary controller 70, or may be provided external to, and in wired or wireless communication with, the exemplary controller 70, including as cloud-based data storage components.

The data storage device(s) 76 may include non-transitory machine-readable storage medium to store the device queue manager logic persistently. While a non-transitory machine-readable storage medium is may be discussed as a single medium, the term "machine-readable storage medium" should be taken to include a single medium or multiple media (e.g., a centralized or distributed database, and/or associated caches and servers) that store one or more sets of instructions. The term "machine-readable storage medium" shall also be taken to include any medium that is capable of storing or encoding a set of instruction for execution by the controller 70 and that causes the digital image forming device 10 to perform any one or more of the methodologies of the present invention. The term "machine-readable storage medium" shall accordingly be taken to include, but not be limited to, solid-state memories, and optical and magnetic media.

The exemplary controller 70 may include at least one data output/display device 78, which may be configured as one or more conventional mechanisms that output information to a user, including, but not limited to, a display screen on a GUI of the digital image forming device 10 or associated image forming device with which the exemplary controller 70 may be associated. The data output/display device 78 may be used to indicate to a user a status of the digital image forming device 10 with which the exemplary controller 70 may be associated including an operation of one or more individually controlled components at one or more of a plurality of separate image processing stations or subsystems associated with the image forming device.

The exemplary controller 70 may include one or more separate external communication interfaces 80 by which the exemplary controller 70 may communicate with components that may be external to the exemplary control system such as a temperature sensor, printer or other image forming device. At least one of the external communication interfaces 80 may be configured as an input port to support connecting an external CAD/CAM device storing modeling information for execution of the control functions in the image formation operations. Any suitable data connection to provide wired or wireless communication between the exemplary controller 70 and external and/or associated components is contemplated to be encompassed by the depicted external communication interface 80.

The exemplary controller 70 may include an image forming control device 82 that may be used to control the image forming process to render ink images on the print substrate 20. For example, the image forming control device 82 may: control the imaging station 24 to form an electrostatic charged pattern 34 on the charge retentive reimageable surface 22, control the aerosol generator 102 to form a fog 110 of fountain solution aerosol particles 36, control the particle charger 104 to drive a flux of ions through the fountain solution aerosol and form charged fountain solution aerosol particles, control the particle sorter 106 to separate the charged particles entrained in the fog into sufficiently charged particles and undesirably charged particles, and control the particle delivery baffle 108 to deposit the sufficiently charged particles adjacent the charge retentive reimageable surface 22 of the imaging member 16 for attachment to an electrostatic charged patter 34 thereon. The image forming control device 82 may operate as a part or a function of the processor 74 coupled to one or more of the data storage devices 76 and the digital image forming device 10 (e.g., imaging station 24, aerosol development device 26, cleaning station 52, inker 54), or may operate as a separate stand-alone component module or circuit in the exemplary controller 70.

All of the various components of the exemplary controller 70, as depicted in FIG. 6, may be connected internally, and to the digital image forming device 10 and/or components thereof, by one or more data/control busses 84. These data/control busses 84 may provide wired or wireless communication between the various components of the image forming device 10 and any associated image forming apparatus, whether all of those components are housed integrally in, or are otherwise external and connected to image forming devices with which the exemplary controller 70 may be associated.

It should be appreciated that, although depicted in FIG. 6 as an integral unit, the various disclosed elements of the exemplary controller 70 may be arranged in any combination of sub-systems as individual components or combinations of components, integral to a single unit, or external to, and in wired or wireless communication with the single unit of the exemplary control system. In other words, no specific configuration as an integral unit or as a support unit is to be implied by the depiction in FIG. 6. Further, although depicted as individual units for ease of understanding of the details provided in this disclosure regarding the exemplary controller 70, it should be understood that the described functions of any of the individually-depicted components, and particularly each of the depicted control devices, may be undertaken, for example, by one or more processors 74 connected to, and in communication with, one or more data storage device(s) 76.

Figure 7:
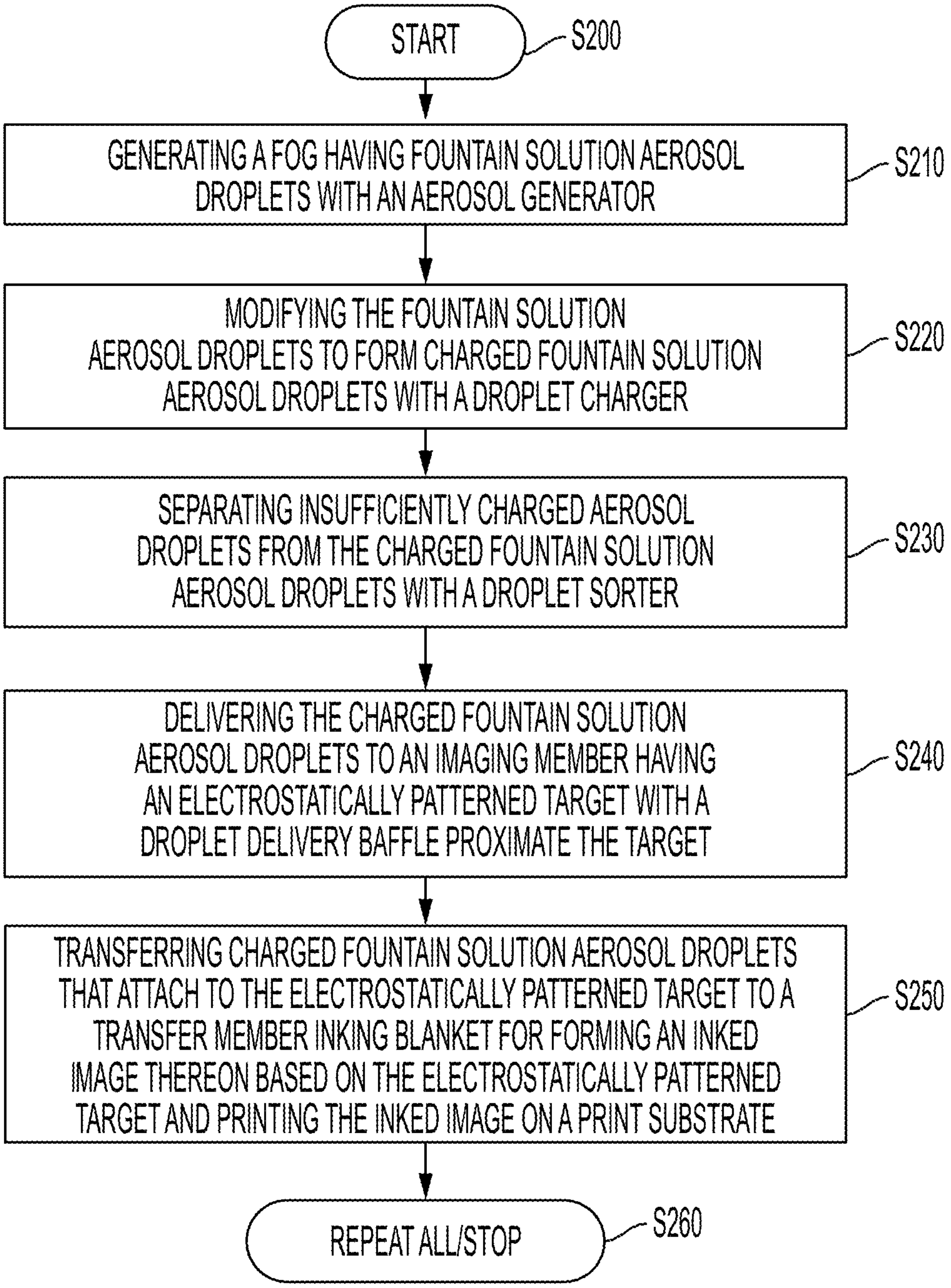
FIG. 7 is a flowchart depicting the operation of a fountain solution aerosol development device and digital image forming device in accordance with examples.

The disclosed embodiments may include an exemplary method for providing a charged fog to a target of the digital image forming device 10 from which an inked image may be printed. FIG. 7 illustrates a flowchart of such an exemplary method. As shown in FIG. 7, operation of the method commences at Step S200 and proceeds to Step S210.

At Step S210, a fog is generated having fountain solution aerosol particles by an aerosol generator. The aerosol generator is not limited to a particular structure, and may include any device that produces a mist or fog including fountain solution aerosol. Such aerosol generators may include a jet nebulizer, T-jet, Y-jet, swirl, or high pressure spray nozzles, and piezo-based atomizers such as vibrating mesh or ultrasonic nebulizers. The fog proceeds into and through an aerosol development device manifold where it may be modified as discussed in greater detail herein.

Operation of the method proceeds to Step S220, where the fountain solution droplets/particles are modified to form charged fountain solution aerosol droplets/particles in the fog. This may be provided by a particle charger in fluid communication with the aerosol generator that drives a flux of ions through the fountain solution aerosol particles to form the charged fountain solution aerosol particles in the fog. The particle charger may include a high voltage source that can charge the aerosol particles by any of numerous approaches including by corona discharge, induction, conduction, and tribocharging as discussed herein by examples and understood by a skilled artisan. The charged fountain solution aerosol particles may be electrically biased or charged to cause the aerosol droplets/particles to adhere to portions of the imaging member having complementary electrostatic charge (e.g., electrostatic charged pattern 34). It is understood that the particle charger may be integrated with the aerosol generator such that Steps S210 and S220 may be combined in a single integrated step to generate a fog of charged fountain solution aerosol particles, as well understood by a skilled artisan.

Operation of the method proceeds to Step S230, where undesirably charged aerosol droplets/particles that would not sufficiently attract to and adhere to desired complementary charged portions of the charge retentive reimageable imaging member surface are separated from the charged fountain solution aerosol particles by a particle sorter. Sorting aerosol particles entrained in air and removing ionized air may be done using electrical fields and air flow. A charged particle will feel a field-dependent force due to an applied electrical field, and a diameter dependent force due to the velocity of the surrounding fluid. Sorting may occur by applying one or more electrical fields across the path of the particles in order to deflect highly charged particles, or by blowing air across the path of the particles to deflect small diameter particles. Magnetic fields may also be used to deflect high speed, high Q/m particles.

Operation of the method proceeds to Step S240, where sufficiently charged aerosol particles of the fog are transferred from the aerosol development device manifold via a particle delivery baffle thereof to an imaging member having an electrostatically patterned target. To deliver the charged particles, the fog may be blown onto the target via, for example, a supply of compressed gas (e.g., compressed air, oxygen, nitrogen) that flows at high velocity through the fountain solution and aerosol development device manifold. Also, the fog may be made to flow parallel to the target aided by the directed fog/gas flow and/or using flow directors such as air knives, counter-rotating rollers or belts with a narrow gap. Charged fountain solution aerosol particles may gravitate and attach to the electrostatically patterned target under sufficient electrical field.

At Step S250, the charged fountain solution aerosol particles that attach to the electrostatically patterned target form a fountain solution latent image that is transferred from the imaging member to a transfer member inking blanket for forming an inked image thereon based on the electrostatically patterned target. The latent image may be a positive image or negative image. Thus the fountain solution latent image may be used to reject inking or facilitate inking, as readily understood by a skilled artisan. The inked image may then be printed on a print substrate. Operation may cease at Step S260, or may continue by repeating back to Step S210, for providing additional charged fog latent imaging and ink image printing.

The exemplary depicted sequence of executable method steps represents one example of a corresponding sequence of acts for implementing the functions described in the steps. The exemplary depicted steps may be executed in any reasonable order to carry into effect the objectives of the disclosed embodiments. No particular order to the disclosed steps of the method is necessarily implied by the depiction in FIG. 7, and the accompanying description, except where any particular method step is reasonably considered to be a necessary precondition to execution of any other method step. Individual method steps may be carried out in sequence or in parallel in simultaneous or near simultaneous timing. Additionally, not all of the depicted and described method steps need to be included in any particular scheme according to disclosure.

Those skilled in the art will appreciate that other embodiments of the disclosed subject matter may be practiced with many types of image forming elements common to offset inking system in many different configurations. For example, although digital lithographic systems and methods are shown in the discussed embodiments, the examples may apply to analog image forming systems and methods, including analog offset inking systems and methods. It should be understood that these are non-limiting examples of the variations that may be undertaken according to the disclosed schemes. In other words, no particular limiting configuration is to be implied from the above description and the accompanying drawings.

It will be appreciated that various of the above-disclosed and other features and functions, or alternatives thereof, may be desirably combined into many other different systems or applications. Also, various presently unforeseen or unanticipated alternatives, modifications, variations or improvements therein may be subsequently made by those skilled in the art, which are also intended to be encompassed by the following claims.

What is claimed is:

1. A charged fountain solution aerosol development device useful for printing with an ink-based image forming apparatus having a rotatable imaging member with a charge-retentive surface bearing an electrostatic charged pattern and a rotatable inkable blanket downstream the imaging member and having a surface in rolling communication with the charge-retentive surface, the rotatable inkable blanket configured to accept a patterned fountain solution latent image and transfer an ink image based on the patterned fountain solution latent image, the charged fountain solution aerosol development device comprising:

a manifold in fluid communication with a fountain solution reservoir through which fountain solution aerosol particles from the fountain solution reservoir traverse;

a particle charger adjacent the manifold that forms a fog of charged fountain solution aerosol particles, the charged fountain solution aerosol particles including undesirably charged particles and sufficiently charged particles; and a particle sorter that receives the fog of charged fountain solution aerosol particles and separates the undesirably charged particles from the charged fountain solution aerosol particles within the manifold resulting in filtered charged fountain solution aerosol particles that are sufficiently attracted to the electrostatic charged pattern to attach to the rotatable imaging member charge-retentive surface and form the patterned fountain solution latent image based on the electrostatically patterned target.

2. The device of claim 1, further comprising an image forming unit adjacent the rotatable charge-retentive reimageable surface that forms the electrostatic charged pattern on the surface.

3. The device of claim 1, wherein the particle charger charges the fountain solution aerosol particles by corona discharge, induction, conduction, or tribocharging to form the charged fountain solution aerosol particles.

4. The device of claim 1, the charged fountain solution aerosol development unit further including an aerosol generator that forms the fountain solution aerosol particles having a range of diameters within plus or minus a factor of two.

5. The device of claim 4, wherein the aerosol generator is a nebulizer that produces the fountain solution aerosol particles having a diameter from 0.5 μm to 2.0 μm.

6. The device of claim 1, further comprising a recovery conduit for the undesirably charged particles to transfer back to the fountain solution reservoir.

7. The device of claim 1, wherein the particle sorter separates the undesirably charged particles from the charged fountain solution aerosol particles by charge-to-mass ratio of the charged particles.

8. The device of claim 1, the manifold further comprising a particle delivery baffle proximate the electrostatic charged pattern to deliver the filtered charged fountain solution aerosol particles from the particle sorter about the charge-retentive surface to enable charged fountain solution aerosol particle attachment to the electrostatic charged pattern and form the charged patterned fountain solution latent image on the charge-retentive surface.

9. The device of claim 8, the manifold having an aerosol supply chamber in fluid communication with the aerosol generator and configured to deliver the charged fountain solution aerosol particles towards the rotatable charge-retentive reimageable surface for transfer of the charged fountain solution aerosol particles to adherence at portions of the charge-retentive reimageable surface and form the charged patterned fountain solution latent image thereon, the charge-retentive reimageable surface configured to transfer the patterned fountain solution latent image from the charge-retentive reimageable surface to the rotatable inkable blanket.

10. The device of claim 8, wherein the particle delivery baffle deposits the charged fountain solution aerosol particles about the charge-retentive reimageable surface via a directed flow of a gas.

11. The device of claim 8, wherein the particle delivery baffle deposits the charged fountain solution aerosol particles about the charge-retentive reimageable surface via a nozzle.

12. The device of claim 8, the particle delivery baffle including an outlet end having a counter electrode proximate the charge-retentive reimageable surface to drive the filtered charged fountain solution aerosol particles toward the electrostatic charged pattern and away from discharged or uncharged areas of the reimageable surface.

13. The device of claim 1, further comprising a carrier gas flow through the charged fountain solution aerosol development device that freezes the fountain solution aerosol particles into solid particles.

14. The device of claim 1, further comprising electrodes downstream the particle charger to remove gas ions from the fog.

15. The device of claim 14, wherein electrodes are screens.

16. The device of claim 1, wherein the sufficiently charged particles have a range of diameters within a factor of two.

17. The device of claim 1, further comprising a controller configured to tune a partial pressure of fountain solution vapor in the fog to control an evaporation or sublimation rate of the charged fountain solution aerosol particles.

18. A fountain solution aerosol particle development system for delivering charged fountain solution aerosol particles onto a target, comprising:

a manifold;

a particle charger that forms a fog of charged fountain solution aerosol particles in the manifold, the charged aerosol particles including undesirably charged particles;

a particle sorter that separates the undesirably charged particles from the charged fountain solution aerosol particles in the manifold; and a particle delivery baffle proximate the target to deposit the charged fountain solution aerosol particles from within the manifold about the target.

19. A method for delivering charged fountain solution aerosol particles onto a target, comprising:

forming a fog having charged fountain solution aerosol particles with a particle charger, with the fog traversing through a manifold;

separating undesirably charged aerosol particles from the charged fountain solution aerosol particles within the manifold with a particle sorter; and depositing the charged fountain solution aerosol particles from within the manifold about the target with a particle delivery baffle proximate the target.

20. The method of claim 19, wherein the target is a moving electrostatically patterned target, and further comprising transferring the charged fountain solution aerosol particles that attach to the electrostatically patterned target to a transfer member inking blanket for forming an inked image thereon based on the electrostatically patterned target.

* * * * *